US012749690B2

(12) United States Patent
Koo et al.

(10) Patent No.: US 12,749,690 B2
(45) Date of Patent: Sep. 29, 2026

(54) SOLID OXIDE CELL

(71) Applicant: SAMSUNG ELECTRO-MECHANICS CO., LTD., Suwon-si (KR)

(72) Inventors: Bon Seok Koo, Suwon-si (KR); Su Beom Park, Suwon-si (KR); A Reum Jun, Suwon-si (KR); Hyeg Soon An, Suwon-si (KR); Jung Hyun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 564 days.

(21) Appl. No.: 18/225,307

(22) Filed: Jul. 24, 2023

(65) Prior Publication Data

US 2024/0186534 A1 Jun. 6, 2024

(30) Foreign Application Priority Data

Dec. 5, 2022 (KR) ........................ 10-2022-0167972
Jan. 20, 2023 (KR) ........................ 10-2023-0008983

(51) Int. Cl.
*H01M 4/90* (2006.01)
*H01M 4/86* (2006.01)
*H01M 8/12* (2016.01)

(52) U.S. Cl.
CPC ............. *H01M 4/905* (2013.01); *H01M 8/12* (2013.01); *H01M 2004/8684* (2013.01); *H01M 2008/1293* (2013.01)

(58) Field of Classification Search
CPC ........... H01M 4/90; H01M 4/905; H01M 8/12
See application file for complete search history.

(56) References Cited

U.S. PATENT DOCUMENTS

2007/0020508 A1 1/2007 Lee et al.
2007/0138446 A1 * 6/2007 Furukawa ................ B22F 1/06 419/23
2009/0035633 A1 2/2009 Rule et al.

FOREIGN PATENT DOCUMENTS

JP 11-219710 A 8/1999
JP 2007-191786 A 8/2007
JP 2010-536143 A 11/2010
JP 2014-006978 A 1/2014
KR 10-2006-0005570 A 1/2006
KR 10-2018-0017718 A 2/2018
WO WO-2011036729 A1 * 3/2011 .......... H01M 4/8642

OTHER PUBLICATIONS

International Search Report and Written Opinion dated Oct. 25, 2023 issued in corresponding International Application No. PCT/KR2023/010677.

* cited by examiner

*Primary Examiner* — Karie O'Neill Apicella
(74) *Attorney, Agent, or Firm* — Morgan, Lewis & Bockius LLP

(57) ABSTRACT

A solid oxide cell includes a fuel electrode, an air electrode, and an electrolyte disposed between the fuel electrode and the air electrode. The fuel electrode includes an electron conductive particle, and the electron conductive particle includes a body and a plurality of protrusions disposed on a surface of the body and having a shape that tapers from a boundary between the body and the protrusions in a direction toward away from the body.

18 Claims, 5 Drawing Sheets

A

SOLID OXIDE CELL

CROSS-REFERENCE TO RELATED APPLICATION (S)

This application claims benefit of priority to Korean Patent Application No. 10-2023-0008983 filed on Jan. 20, 2023 and Korean Patent Application No. 10-2022-0167972 filed on Dec. 5, 2022, in the Korean Intellectual Property Office, the disclosures of which are incorporated herein by reference in their entirety.

TECHNICAL FIELD

The present disclosure relates to a solid oxide cell.

A solid oxide fuel cell (SOFC) and a solid oxide electrolysis cell (SOEC) include a cell composed of an air electrode, a fuel electrode, and a solid electrolyte having ion conductivity, and in this case, the cell may be referred to as a solid oxide cell. The solid oxide cell produces electrical energy through an electrochemical reaction or electrolyzes water through the reverse reaction of a solid oxide fuel cell to produce hydrogen. Solid oxide cells have low overvoltage based on the low activation polarization, and low irreversible loss, and thus have high efficiency, compared to other types of fuel cells or water electrolysis cells, such as phosphoric acid fuel cells (PAFC), alkali fuel cells (AFC), polymer electrolyte fuel cells (PEMFC), direct methanol fuel cells (DMFC), or the like. In addition, it may be used as carbon or hydrocarbon-based fuel as well as hydrogen, so there is a wide range of fuel choices. Since the reaction rate at the electrode is high, it has the advantage of not requiring expensive precious metals as an electrode catalyst.

As a method for improving the efficiency of the solid oxide cell, attempts to improve the reaction efficiency in the electrode layer have been continued in the art.

SUMMARY

An aspect of the present disclosure is to implement a solid oxide cell capable of improving reaction efficiency in an electrode layer, in detail, a fuel electrode.

According to an aspect of the present disclosure, a novel structure of a solid oxide cell is proposed through an example, and the solid oxide cell includes a fuel electrode, an air electrode, and an electrolyte disposed between the fuel electrode and the air electrode. The fuel electrode includes an electron conductive particle, and the electron conductive particle includes a body and a plurality of protrusions disposed on a surface of the body and having a shape that tapers from a boundary between the body and the protrusions in a direction toward away from the body.

The body may have a spherical shape.

When a diameter of the body is D and a height of the protrusion is H, H may be 10% or more of D.

H may be 10% or more and 50% or less of D.

A height of the protrusion may be 50 nm to 1 μm.

At least one of the plurality of protrusions may have a conical shape.

At least one of the plurality of protrusions may have a horn shape without a vertex.

The protrusion may have an end of a flat or curved shape.

In the electron conductive particle, at least two of the plurality of protrusions may have different heights.

At least two of the plurality of protrusions in the electron conductive particle may be spaced apart from each other.

The fuel electrode may include a plurality of the electron conductive particles, and at least two of the plurality of electron conductive particles may form aggregates with each other.

The electron conductive particle may include Ni.

The fuel electrode may further include an ion conductor.

The ion conductor may include at least one of gadolinia doped ceria (GDC), samaria doped ceria (SDC), ytterbia doped ceria (YDC), scandia stabilized zirconia (SSZ), or ytterbia ceria scandia stabilized zirconia (YbCSSZ).

The ion conductor may be in contact with an end of the protrusion.

The ion conductor may fill at least a portion of a space between adjacent protrusions among the plurality of protrusions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
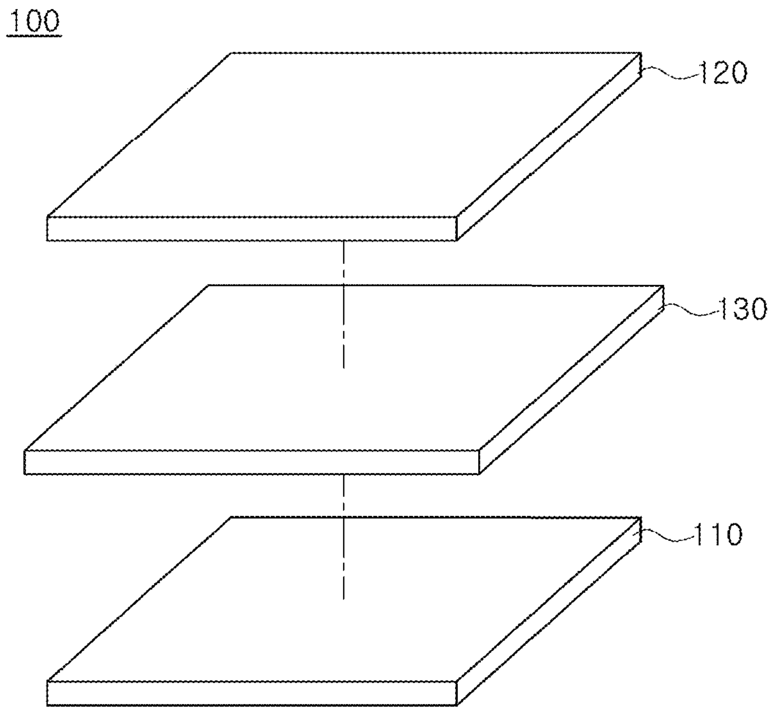
FIG. 1 is an exploded perspective view schematically illustrating a solid oxide cell according to an embodiment.

Hereinafter, embodiments will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

To clearly describe the present disclosure in the drawings, parts irrelevant to the description are omitted, and to clearly express the various layers and regions, the thickness is enlarged and illustrated, and elements having the same function within the scope of the same concept are described using the same reference numerals. Furthermore, throughout the specification, when a certain component is said to "include," it means that it may further include other components without excluding other components unless otherwise stated.

FIG. 1 is an exploded perspective view schematically illustrating a solid oxide cell according to an embodiment.

Figure 2:
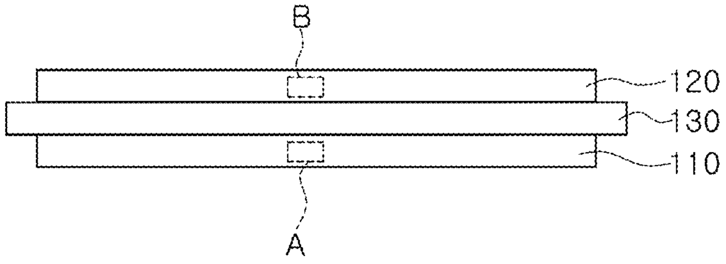
FIG. 2 is a cross-sectional view of a region in the solid oxide cell of FIG. 1.
Figure 3:
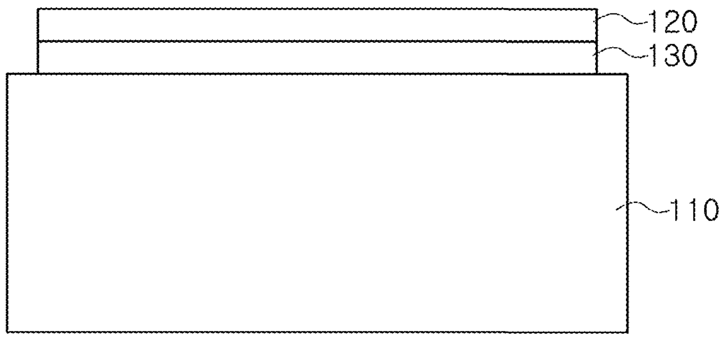
FIG. 3 is a cross-sectional view of one region in a solid oxide cell according to a modified example.
Figure 4:
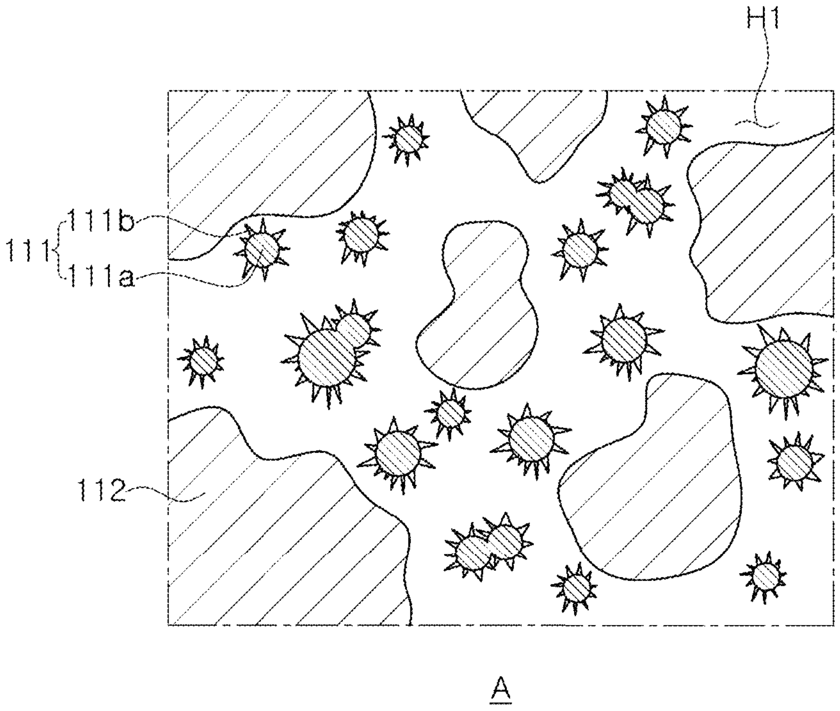
FIG. 4 is an enlarged view of region A of a fuel electrode illustrated in FIG. 2.
Figure 5:
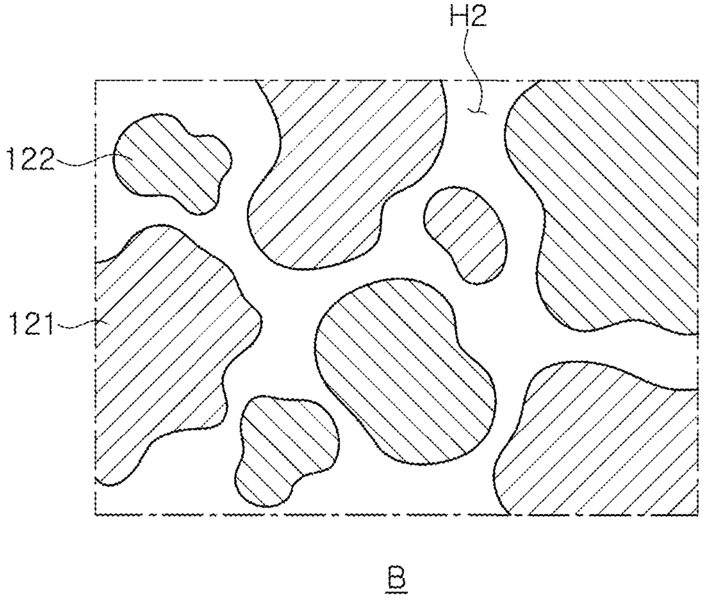
FIG. 5 is an enlarged view of region B of an air electrode illustrated in FIG. 2.

FIG. 2 is a cross-sectional view of the solid oxide cell of FIG. 1, and FIG. 3 is a cross-sectional view of the solid oxide cell according to a modified example. FIG. 4 is an enlarged view of region A of the fuel electrode illustrated in FIG. 2, and FIG. 5 is an enlarged view of region B of the air electrode illustrated in FIG. 2.

Referring to FIGS. 1 to 5, a solid oxide cell 100 according to an embodiment includes a fuel electrode 110, an air electrode 120, and an electrolyte 130 disposed therebetween, as main components. In this case, the fuel electrode 110 includes electron conductive particles 111, and each of the electron conductive particles 111 includes a body 111*a*, and a plurality of protrusions 111*b* formed on the surface of the body 111*a* and having a shape that tapers from a boundary between the body and the protrusions in a direction toward away from the body. As in the present embodiment, the electron conductive particles 111 of the fuel electrode 110 include the electron conductive particles 111 having the protrusions 111*b* as electron conductors, and thus, the surface area of the electron conductors may be improved, and thus the reaction region in the fuel electrode 110 may increase. In addition, as reaction efficiency in the fuel electrode 110 is improved, the performance of the fuel electrode 110 may be improved. For example, when the solid oxide cell 100 is a fuel cell, the magnitude of the generated voltage may increase. When the solid oxide cell 100 is a water electrolysis cell, the amount of hydrogen generated per unit time may increase. Hereinafter, components of the solid oxide cell 100 will be described in detail, and a case in which the solid oxide cell 100 is used as a fuel cell will be mainly described. However, the solid oxide cell 100 may also be used as a water electrolysis cell. When the solid oxide cell is used as a water electrolysis cell, a reaction opposite to the reaction in the case of a fuel cell will occur in the fuel electrode 110 and the air electrode 120 of the solid oxide cell 100.

In detail, when the solid oxide cell 100 is a fuel cell, for example, in the fuel electrode 110, water generation due to oxidation of hydrogen or an oxidation reaction of carbon compounds may occur, and in the air electrode 120, an oxygen ion generating reaction due to decomposition of oxygen may occur. When the solid oxide cell 100 is a water electrolysis cell, the opposite reaction may occur. For example, hydrogen gas may be generated according to a reduction reaction of water in the fuel electrode 110, and oxygen may be generated in the air electrode 120. As another example, in the case of a fuel cell, hydrogen decomposition (hydrogen ion generation) reaction in the fuel electrode 110 and water generation due to combination of oxygen and hydrogen ions in the air electrode 120 may occur. In the case of a water electrolysis cell, decomposition of water (generation of hydrogen and oxygen ions) occurs in the fuel electrode 110, and oxygen may be generated in the air electrode 120. In the electrolyte 130, ions may move to the fuel electrode 110 or the air electrode 120.

FIG. 2 illustrates an embodiment in which the electrolyte 130 supports the solid oxide cell 100. In this case, the width of the electrolyte 130 may be the widest among the fuel electrode 110, the air electrode 120 and the electrolyte 130. In contrast, FIG. 3 illustrates an embodiment in which the fuel electrode 110 supports the air electrode 120 and the electrolyte 130. In this case, the fuel electrode 110 may be the thickest among the fuel electrode 110, the air electrode 120 and the electrolyte 130.

As illustrated in FIG. 4, the fuel electrode 110 includes electron conductive particles 111 as electron conductors and may further include ion conductors 112. In this case, the electron conductive particles 111 and the ion conductor 112 may be a sintered body. Accordingly, the fuel electrode 110 may have a porous structure including pores H1, and gases, fluids, or the like may flow in and out through the pores H1. In this case, the electron conductive particles 111 of the fuel electrode 110 may act as an electrical conductor or play catalytic functions and the like and may include metal particles. In some embodiments, the electron conductive particles 111 may include Ni.

Referring to FIG. 5, the air electrode 120 may include an electron conductor 121 and an ion conductor 122, which may be sintered bodies. In the air electrode 120, the electron conductor 121 includes lanthanum strontium manganese (LSM), lanthanum strontium cobalt (LSC), lanthanum strontium cobalt manganese (LSCM), lanthanum strontium cobalt ferrite (LSCF), lanthanum strontium ferrite (LSF), barium strontium cobalt iron (BSCF), or samadium strontium cobalt (SSC)-based materials, etc. The ion conductor 122 may include a material such as yttria stabilized zirconia (YSZ), ceria ($CeO_2$), bismuth oxide ($Bi_2O_3$), lanthanum gallate ($LaGaO_3$), or the like. In addition, the air electrode 120 may be a porous body including pores H2, and gases, fluids, or the like may flow in and out through the pores H2.

The electrolyte 130 is disposed between the fuel electrode 110 and the air electrode 120, and ions may move to the fuel electrode 110 or the air electrode 120. In some embodiments, materials constituting the ion conductors 112 and 122 of the fuel electrode 110 and the air electrode 120 may be included in the electrolyte 130. As a representative example, the electrolyte 130 may include stabilized zirconia. In detail, the electrolyte 130 may include scandia stabilized zirconia (SSZ), yttria stabilized zirconia (YSZ), scandia ceria stabilized zirconia (SCSZ), scandia ceria yttria stabilized zirconia (SCYSZ), or scandia ceria ytterbia stabilized zirconia (SCYbSZ), etc.

The configuration of the fuel electrode 110 will be described in more detail with reference to FIGS. 4 and 6 to 8. As described above, the fuel electrode 110 may include a plurality of electron conductive particles 111. In this case, each of the electron conductive particles 111 includes a body 111*a* and a plurality of protrusions 111*b* formed on the surface of the body 111*a* and having a shape that tapers from a boundary between the body and the protrusions in a direction toward away from the body, and the protrusions 111*b* may be a horn shape. The surface of the electron conductive particles 111 may serve as a region where a reaction takes place within the fuel electrode 110. By including a plurality of horn structures formed on the surfaces of the electron conductive particles 111, the specific surface area of the electron conductive particles 111 may be increased, and thus the reactivity within the fuel electrode 110 may be improved. Powder having protrusions on its surface may be used as a raw material to produce the electron conductive particles 111 such that the electron conductive particles 111 have the above-described surface structure. According to the experiments of the present inventors, it was confirmed that the shape of the protrusions of the powder was maintained in at least some areas after sintering the powder having the protrusions. After sintering, as illustrated in FIG. 4, at least two of the plurality of electron conductive particles 111 may form aggregates with each other. In some embodiments, Ni-based powder, such as Nio powder, may be used for the powder to produce the electron conductive particles 111.

Figure 6:
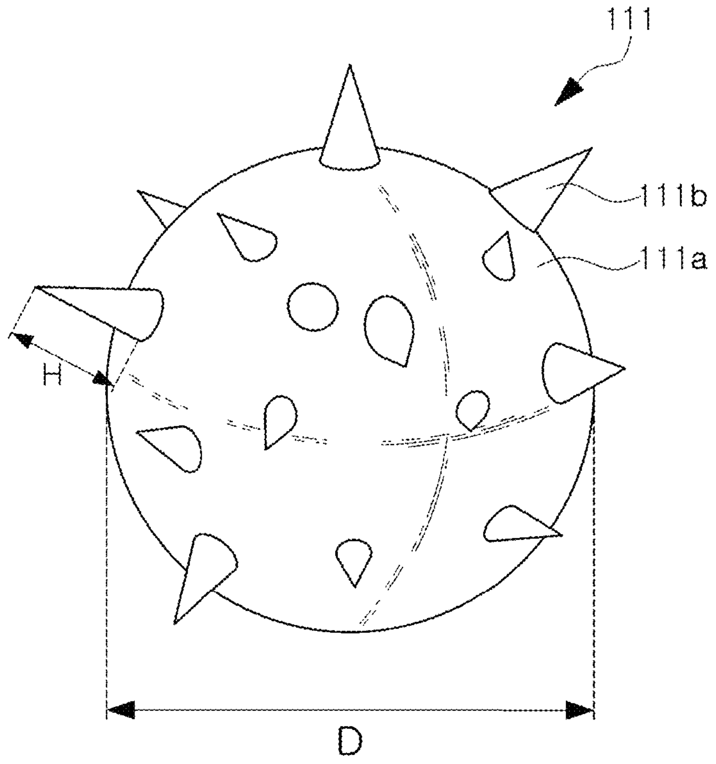
FIG. 6 is a perspective view illustrating an example of an electron conductive particle included in a fuel electrode.

As illustrated in FIG. 6, the body 111*a* of the electron conductive particle 111 may have a spherical shape. However, the body 111*a* may also have a shape other than a spherical shape, for example, a polyhedron structure such as a hexahedron, octahedron, or dodecahedron. In some embodiments, the body 111*a* of the electron conductive particle 111 may have an amorphous structure. The diameter (D) of the body 111*a* may be measured on a cross section passing through the center of the body 111*a*. If the cross section is not a circle, the diameter may be obtained by converting to a diameter equivalent to a circle. Also, the horn shape of the protrusion 111*b* may be defined as a shape in which the diameter of the protrusion 111*b* or the area of a cross section parallel to the bottom surface decreases in a direction away from an area adjacent to the body 111*a*. If the bottom surface of the protrusion 111*b* is not circular, the diameter may refer to a diameter equivalent to a circle. In some embodiments, at least one of the plurality of protrusions 111*b* may have a conical shape. FIG. 6 illustrates that all of the protrusions 111*b* have a conical shape, but some of the protrusions 111*b* may have other shapes, such as a pyramidal shape, a cone shape, a similar horn shape, etc.

In some embodiments, it may be preferable to maintain the height of the protrusion 111*b* at a predetermined level relative to the size of the body 111*a* such that the specific surface area of the electron conductive particles 111 may be sufficiently secured. For example, if the protrusion 111*b* is not formed to a sufficient height, the effect of improving the specific surface area may be insignificant. Considering this, when D is the diameter of the body 111*a* and H is the height of the protrusion 111*b*, H may be 10% or more of D. In some embodiments, H may be 10% or more and 50% or less of D. In some embodiments, H may be 20% or more and 40% or less of D. In some embodiments, H may be 30% or more and 40% or less of D. In some embodiments, the height (H) of at least one the protrusion 111*b* may be 50 nm to 1 μm. In some embodiments, the height (H) of at least one the protrusion 111*b* may be at least 100 nm, at least 500 nm, or at least 800 nm. In addition, as described above, the protrusion 111*b* of the electron conductive particle 111 may be formed in a pyramidal shape or a similar horn shape in addition to a conical shape. In some embodiments, the size of the protrusion 111*b* may be different. In some embodiments, at least two of the plurality of protrusions 111*b* of the electron conductive particle 111 may have different heights H from each other. If the plurality of protrusions 111*b* have a horn structure, the horn structure may have vertices. In some embodiments, an end of at least one of the plurality of protrusions 111*b* may have a vertex shape. In some embodiments, as an example of a similar horn structure having no vertex, or as in the modified example of FIG. 8, an end of at least one of the plurality of protrusions 111*b* may have a flat surface on a top or curved shape.

Figure 7:
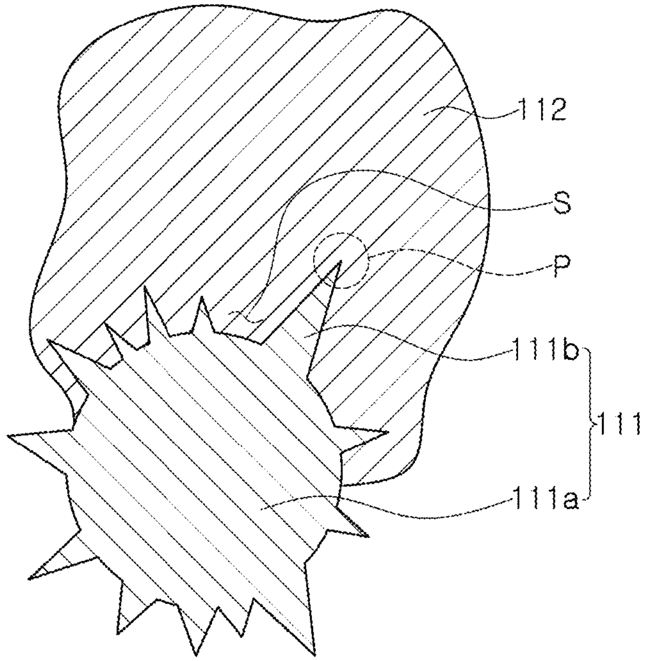
FIG. 7 is a cross-sectional view illustrating the electron conductive particle and an ion conductor included in a fuel electrode.
Figure 8:
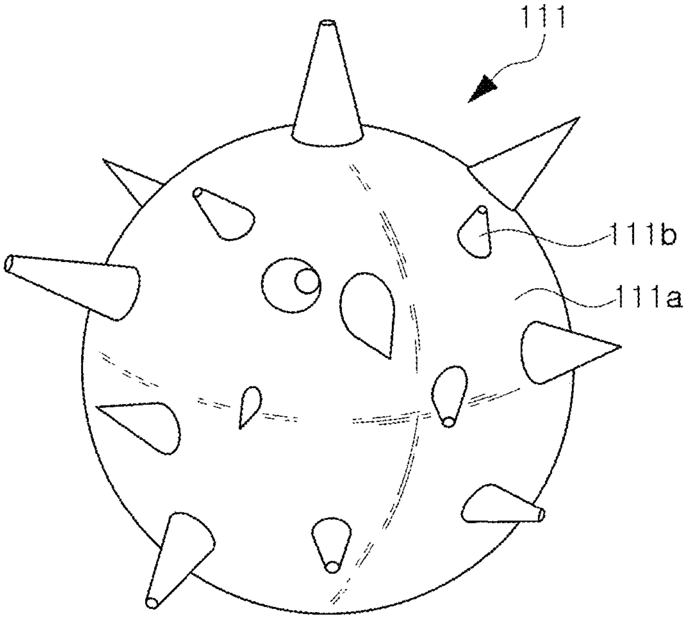
FIG. 8 is a perspective view illustrating another example of an electron conductive particle included in a fuel electrode.

As described above, the fuel electrode 110 may further include the ion conductor 112. In some embodiments, the ion conductor 112 may include at least one of gadolinia doped ceria (GDC), samaria doped ceria (SDC), ytterbia doped ceria (YDC), scandia stabilized zirconia (SSZ), or ytterbia ceria scandia stabilized zirconia (YbCSSZ). As illustrated in FIG. 7, a contact area between the ion conductor 112 and the electron conductive particle 111 may be increased by the protrusion 111*b* of the electron conductive particle 111. As the contact area between the electron conductive particles 111 and the ion conductor 112 increases in this manner, reaction efficiency within the fuel electrode 110 may be significantly improved. In this case, the ion conductor 112 may contact the end P of the protrusion 111*b*. In some embodiments, the ion conductor 112 may fill at least a portion of the space S between adjacent protrusions 111*b* among the plurality of protrusions 111*b*.

The contact area between the electron conductive particles 111 and the ion conductor 112 may be effectively increased if the ion conductor 112 contacts the end P of the protrusion 111*b* or the space S between the protrusions 111*b* is filled with the ion conductor 112. In this case, at least two of the plurality of protrusions 111*b* of the electron conductive particle 111 may be spaced apart from each other. As in the present embodiment, the protrusion 111*b* has a horn shape, a pyramidal shape, a cone shape, or a similar horn shape, the interface between the electron conductive particles 111 and the ion conductor 112 may be increased, compared to the case where simple irregular shapes (e.g., the form in which all of the irregularities are connected to each other) are formed on the surface of the body 111*a*. Furthermore, when at least two protrusions 111*b* spaced apart from each other are provided, as the space S between the protrusions 111*b* is secured, a contact area between the electron conductive particles 111 and the ion conductor 112 may be further increased.

As set forth above, in the case of a solid oxide cell according to an example, reaction efficiency in the electrode layer may be improved. Therefore, performance may be improved when the solid oxide cell is used as a fuel cell or water electrolysis cell.

While example embodiments have been illustrated and described above, it will be apparent to those skilled in the art that modifications and variations could be made without departing from the scope of the present disclosure as defined by the appended claims.

What is claimed is:

1. A solid oxide cell comprising:
a fuel electrode;
an air electrode; and
an electrolyte disposed between the fuel electrode and the air electrode,
wherein the fuel electrode includes an electron conductive particle, and the electron conductive particle includes a body and a plurality of protrusions extending from a surface of the body and having a shape that tapers from a boundary between the body and the protrusions in a direction toward away from the body, and
wherein at least one of the plurality of protrusions does not have a vertex.

2. The solid oxide cell of claim 1, wherein the body is spherical.

3. The solid oxide cell of claim 2, wherein when a diameter of the body is D and a height of at least one of the plurality of protrusions is H, His 10% or more of D.

4. The solid oxide cell of claim 3, wherein His 10% or more and 50% or less of D.

5. The solid oxide cell of claim 1, wherein a height of at least one of the plurality of protrusions is 50 nm to 1 μm.

6. The solid oxide cell of claim 1, wherein at least one of the plurality of protrusions has a conical shape.

7. The solid oxide cell of claim 1, wherein the at least one of the plurality of protrusion has a top having a flat or curved shape.

8. The solid oxide cell of claim 1, wherein in the electron conductive particle, at least two of the plurality of protrusions have different heights.

9. The solid oxide cell of claim 1, wherein at least two of the plurality of protrusions in the electron conductive particle are spaced apart from each other.

10. The solid oxide cell of claim 1, wherein the fuel electrode includes a plurality of the electron conductive particles, wherein at least two of the plurality of electron conductive particles form aggregates with each other.

11. The solid oxide cell of claim 1, wherein the electron conductive particle includes Ni.

12. The solid oxide cell of claim 1, wherein the fuel electrode further includes an ion conductor.

13. The solid oxide cell of claim 12, wherein the ion conductor includes at least one of gadolinia doped ceria (GDC), samaria doped ceria (SDC), ytterbia doped ceria (YDC), scandia stabilized zirconia (SSZ), or ytterbia ceria scandia stabilized zirconia (YbCSSZ).

14. The solid oxide cell of claim 12, wherein the ion conductor is in contact with an end of the protrusion.

15. The solid oxide cell of claim 12, wherein the ion conductor fills at least a portion of a space between adjacent protrusions among the plurality of protrusions.

16. An electron conductor comprising an electron conductive particle including a body and a plurality of protrusions extending from a surface of the body, wherein at least one of the plurality of protrusion has a shape that tapers from a boundary between the body and the protrusions in a direction toward away from the body, and wherein a diameter of the body is D, a height of at least one of the plurality of protrusions is H, and His more than 25% of D.

17. The electron conductor of claim 16, wherein H is 50% or less of D.

18. The electron conductor of claim 16, wherein a height of at least one of the plurality of protrusions is 50 nm to 1 μm.

* * * * *